US009265991B2

(12) United States Patent
Hohteri (10) Patent No.: US 9,265,991 B2
(45) Date of Patent: Feb. 23, 2016

(54) METHOD AND SYSTEM FOR MONITORING MOVEMENT OF A SPORT PROJECTILE

(71) Applicant: SSTATZZ OY, Helsinki (FI)

(72) Inventor: Harri Hohteri, Helsinki (FI)

(73) Assignee: Sstatzz Oy, Helsinki (FI)

( * ) Notice: Subject to any disclaimer, the term of this patent is extended or adjusted under 35 U.S.C. 154(b) by 17 days.

(21) Appl. No.: 14/153,468

(22) Filed: Jan. 13, 2014

(65) Prior Publication Data

US 2014/0128182 A1 May 8, 2014

Related U.S. Application Data

(63) Continuation-in-part of application No. 13/660,385, filed on Oct. 25, 2012, now Pat. No. 9,079,090, and a continuation of application No. 13/922,676, filed on Jun. 20, 2013, now abandoned.

(51) Int. Cl.
*A63B 71/00* (2006.01)
*A63B 43/00* (2006.01)
(Continued)

(52) U.S. Cl.
CPC .............. *A63B 43/00* (2013.01); *A63B 24/0021* (2013.01); *A63B 24/0062* (2013.01); *G01S 5/0027* (2013.01); *G01S 5/02* (2013.01); *G01S 13/34* (2013.01); *G01S 13/751* (2013.01);
(Continued)

(58) Field of Classification Search
CPC .............. A63B 24/00; A63B 24/0003; A63B 24/0006; A63B 24/0021; A63B 2024/0028; A63B 2024/0031; A63B 2024/0034; A63B 2024/0037
See application file for complete search history.

(56) References Cited

U.S. PATENT DOCUMENTS 5,487,542 A * 1/1996 Foley .............................. 473/153
6,157,898 A * 12/2000 Marinelli ....................... 702/141
(Continued)

FOREIGN PATENT DOCUMENTS

EP 2150057 A2 2/2010
EP 2515548 A1 10/2012
(Continued)

OTHER PUBLICATIONS

Extended European Search Report, EP Application No. 13187645. 0/1906, mailed Jan. 7, 2014.
(Continued)

*Primary Examiner* — Lawrence Galka
(74) *Attorney, Agent, or Firm* — Ziegler IP Law Group, LLC (57) ABSTRACT

A sports apparatus for monitoring movement of a sport projectile includes a sensor and a wireless interface disposed within the sport projectile for communicating sampled data signals from the sensor, a portable communication device in wireless communication with the wireless sensor for receiving sampled data signals from the wireless sensor, the sampled data signals indicative of a motion of the sport projectile. The portable communication device includes a controller having a memory including programming instructions that when executed by the processor cause the controller to detect a sensor signal from the wireless interface, determine a motion characteristic of the sport projectile from the motion characteristic from the sensor signal, and determine if the motion characteristic is passage of the sports projectile through a goal structure, motion of the sports projectile after a shot or an impact of the sport projectile with an object.

22 Claims, 8 Drawing Sheets

(51) Int. Cl.
  *A63B 24/00* (2006.01)
  *G01S 13/34* (2006.01)
  *G01S 13/75* (2006.01)
  *G01S 13/82* (2006.01)
  *G01S 19/19* (2010.01)
  *H04M 1/725* (2006.01)
  *G01S 5/00* (2006.01)
  *G01S 5/02* (2010.01)
  *A63B 71/06* (2006.01)

(52) U.S. Cl.
  CPC ............. *G01S13/82* (2013.01); *G01S 19/19* (2013.01); *H04M 1/7253* (2013.01); *A63B 71/0605* (2013.01); *A63B 2024/0028* (2013.01); *A63B 2024/0071* (2013.01); *A63B 2102/02* (2015.10); *A63B 2102/14* (2015.10); *A63B 2102/18* (2015.10); *A63B 2102/20* (2015.10); *A63B 2102/22* (2015.10); *A63B 2102/24* (2015.10); *A63B 2102/32* (2015.10); *A63B 2220/12* (2013.01); *A63B 2220/13* (2013.01); *A63B 2220/40* (2013.01); *A63B 2220/53* (2013.01); *A63B 2220/56* (2013.01); *A63B 2220/58* (2013.01); *A63B 2220/833* (2013.01); *A63B 2225/50* (2013.01); *A63B 2225/54* (2013.01); *A63B 2243/007* (2013.01); *A63B 2243/0025* (2013.01); *A63B 2243/0066* (2013.01); *H04M 1/72569* (2013.01)

(56) References Cited

U.S. PATENT DOCUMENTS

| | | | |
|---|---|---|---|
| 6,380,933 | B1 | 4/2002 | Sharir |
| 6,710,713 | B1 | 3/2004 | Russo |
| 6,950,123 | B2 | 9/2005 | Martins |
| 7,487,045 | B1 * | 2/2009 | Vieira ............................... 702/2 |
| 7,499,077 | B2 | 3/2009 | Li |
| 7,620,466 | B2 | 11/2009 | Neale |
| 8,279,051 | B2 | 10/2012 | Khan |
| 8,289,185 | B2 | 10/2012 | Alonso |
| 2003/0054905 | A1 * | 3/2003 | King, Jr. ....................... 473/467 |
| 2005/0259002 | A1 * | 11/2005 | Erario et al. ............. 342/357.07 |
| 2006/0135297 | A1 * | 6/2006 | Cruciani ....................... 473/570 |
| 2007/0135243 | A1 | 6/2007 | LaRue |
| 2008/0089666 | A1 | 4/2008 | Aman |
| 2008/0090683 | A1 * | 4/2008 | Englert et al. ................ 473/570 |
| 2008/0129825 | A1 | 6/2008 | DeAngelis |
| 2008/0140233 | A1 | 6/2008 | Seacat |
| 2008/0192116 | A1 | 8/2008 | Tamir |
| 2009/0111582 | A1 * | 4/2009 | Schuler et al. .................. 463/42 |
| 2009/0191988 | A1 * | 7/2009 | Klein ............................. 473/480 |
| 2009/0262137 | A1 | 10/2009 | Walker |
| 2010/0030350 | A1 | 2/2010 | House |
| 2010/0134614 | A1 | 6/2010 | Aman |
| 2010/0283630 | A1 * | 11/2010 | Alonso ................... 340/870.11 |
| 2011/0071792 | A1 | 3/2011 | Miner |
| 2011/0105226 | A1 | 5/2011 | Perlman |
| 2011/0194730 | A1 | 8/2011 | Rhoads |
| 2011/0304497 | A1 | 12/2011 | Molyneux |
| 2012/0040783 | A1 * | 2/2012 | Bucher ......................... 473/478 |
| 2012/0041709 | A1 * | 2/2012 | Englert ......................... 702/150 |
| 2012/0057852 | A1 | 3/2012 | Devleeschouwer |
| 2012/0058845 | A1 | 3/2012 | Crowley |
| 2012/0262329 | A1 * | 10/2012 | Molyneux et al. .............. 342/42 |
| 2012/0271440 | A1 * | 10/2012 | Lunner et al. ................... 700/91 |
| 2013/0095961 | A1 * | 4/2013 | Marty et al. .................. 473/450 |

FOREIGN PATENT DOCUMENTS

| | | |
|---|---|---|
| WO | 95/08816 A1 | 3/1995 |
| WO | 99/57900 A1 | 11/1999 |
| WO | 02/09833 A1 | 2/2002 |

OTHER PUBLICATIONS

Anonymous: "GPS tracking Unit—Wikipedia, the free encyclopedia", Apr. 5, 2013, XP055140038, retrieved from the internet: URL:http://en.wikipedia.org/w/index.php?title=GPS_tracking_unit&oldid=54887452 [retrieved on Sep. 15, 2014], 6 pages.
Extended European Search Report; EP App. No. 14162990.7; dated Oct. 9, 2014, 9 pages.

* cited by examiner

METHOD AND SYSTEM FOR MONITORING MOVEMENT OF A SPORT PROJECTILE

CROSS-REFERENCE TO RELATED APPLICATION

This application is a continuation-in-part application of U.S. patent application Ser. No. 13/660,385 filed on 25 Oct. 2012, the disclosure of which is incorporated herein by reference in its entirety.

BACKGROUND

1. Field

The aspects of the present disclosure generally relate to a sports apparatus, for example to sports apparatus including one or more projectiles, for example one or more balls, wherein the projectiles include one or more sensors and a wireless communication interface, and a data processing arrangement also equipped with a wireless interface, for example implemented via a smart phone and/or a personal computer and/or a remote server with data processing functionality, wherein the one or more sensors of the one or more projectiles provide sensor signals indicative of movements of the one or more projectiles, wherein the sensor signals are communicated to the data processing arrangement for analysis and recording. Moreover, the present disclosure relates to methods of operating aforesaid sports apparatus for recording movement of the one or more projectiles for subsequent analysis and reporting. Furthermore, the present disclosure relates to software products recorded on machine-readable data storage media, wherein the software products are executable upon computing hardware for implementing aforesaid methods.

2. Brief Description of Related Developments

It is well known to track movement of one or more projectiles, for example one or more balls, utilized when playing a sports game, for example football or basketball, to determine statistical information relating to the sports game. Such statistical information can include a number of goals or points scored, and performance of one or more players of the sports game. Such tracking has often been implemented using cameras, personnel collating statistics manually as well as using sensors included in the one or more projectiles. However, known approaches for analysing movement of the one or more projectiles are not well developed, such that inadequate analysis of sports games utilizing the one or more projectiles is not presently achievable.

In US Patent Publication No. US2012/0058845A1, there is described a basketball which incorporates motion sensors. The motion sensors include, for example, one or more accelerometers, one or more angular rate gyroscopic sensors and one or more magnetometers. In the application, it is elucidated that sensor signals from the motion sensors can be analyzed to generate statistical results, but the application is devoid of detail of how the statistical analysis can be performed in practice.

There arises therefore a problem that known apparatus for providing analysis of trajectories of one or more projectiles associated with sports events are not sufficiently evolved and do not provide statistical analysis to a fullest extent which is potentially feasible to achieve.

SUMMARY

The present disclosure provides an improved sports apparatus, wherein movements of one or more projectiles employed in sports activities are more fully analyzed using the sports apparatus.

The present disclosure provides an improved method of using sports apparatus, wherein the method is capable of analyzing movements of one or more projectiles employed in sports activities more fully analyzed using the sports apparatus.

In one aspect, the present disclosure provides a sports apparatus for monitoring movement of one or more projectiles associated with a sporting event. In one embodiment, the sports apparatus for monitoring movement of a sport projectile includes a sensor and a wireless interface disposed within the sport projectile for communicating sampled data signals from the sensor, a portable communication device in wireless communication with the wireless sensor for receiving sampled data signals from the wireless sensor, the sampled data signals indicative of a motion of the sport projectile. The portable communication device includes a controller having a memory including programming instructions that when executed by the processor cause the controller to detect a sensor signal from the wireless interface, determine a motion characteristic of the sport projectile from the motion characteristic from the sensor signal, and determine if the motion characteristic is passage of the sports projectile through a goal structure, motion of the sports projectile after a shot or an impact of the sport projectile with an object.

The mobile telephone executing the one or more software or computer program products is capable of providing more full analysis of movements of the one or more projectiles.

In another aspect, the present disclosure provides a method of using a sports apparatus for monitoring movement of one or more projectiles associated with a sporting event. The method involves using a mobile telephone coupled in wireless communication with the one or more projectiles for receiving the sampled data signals indicative of motion of the one or more projectiles; and using the mobile telephone to execute one or more software products therein for analyzing the sampled data signals received at the mobile telephone for providing analysis results indicative of a nature of trajectory of the one or more projectiles.

In another aspect, the present disclosure provides a software or computer program product recorded on machine-readable data storage media. The software or computer program product includes or comprises non-transitory computer readable code means, which is executable upon computing hardware or in a processor devices for implementing the methods and processes of the present disclosure.

It will be appreciated that features of the present disclosure are susceptible to being combined in various combinations without departing from the scope of the invention as defined by the appended claims.

BRIEF DESCRIPTION OF THE DRAWINGS

Embodiments of the present disclosure will now be described, by way of example only, with reference to the following diagrams wherein.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF ILLUSTRATIVE EMBODIMENTS

The following detailed description discloses aspects of the claimed invention and the ways it can be implemented. However, the description is not intended to define or limit the invention, such definition or limitation being solely contained in the claims appended thereto. Although the best mode of carrying out the invention has been disclosed comprehensively, those in the art would recognize that other embodiments for carrying out or practicing the invention are also possible.

In overview, the present disclosure relates to a sports apparatus for use at a sporting event, wherein the sports apparatus comprises one or more projectiles, for example balls, discus, shuttlecock or similar, and a data processing arrangement for receiving wireless transmissions from the one or more projectiles indicative of movement of the one or more projectiles, wherein the data processing arrangement is operable to receive the wireless transmissions from the one or more projectiles and generate various types of statistical analysis results which enable performance at the sporting event to be assessed and/or recorded.

Figure 1:
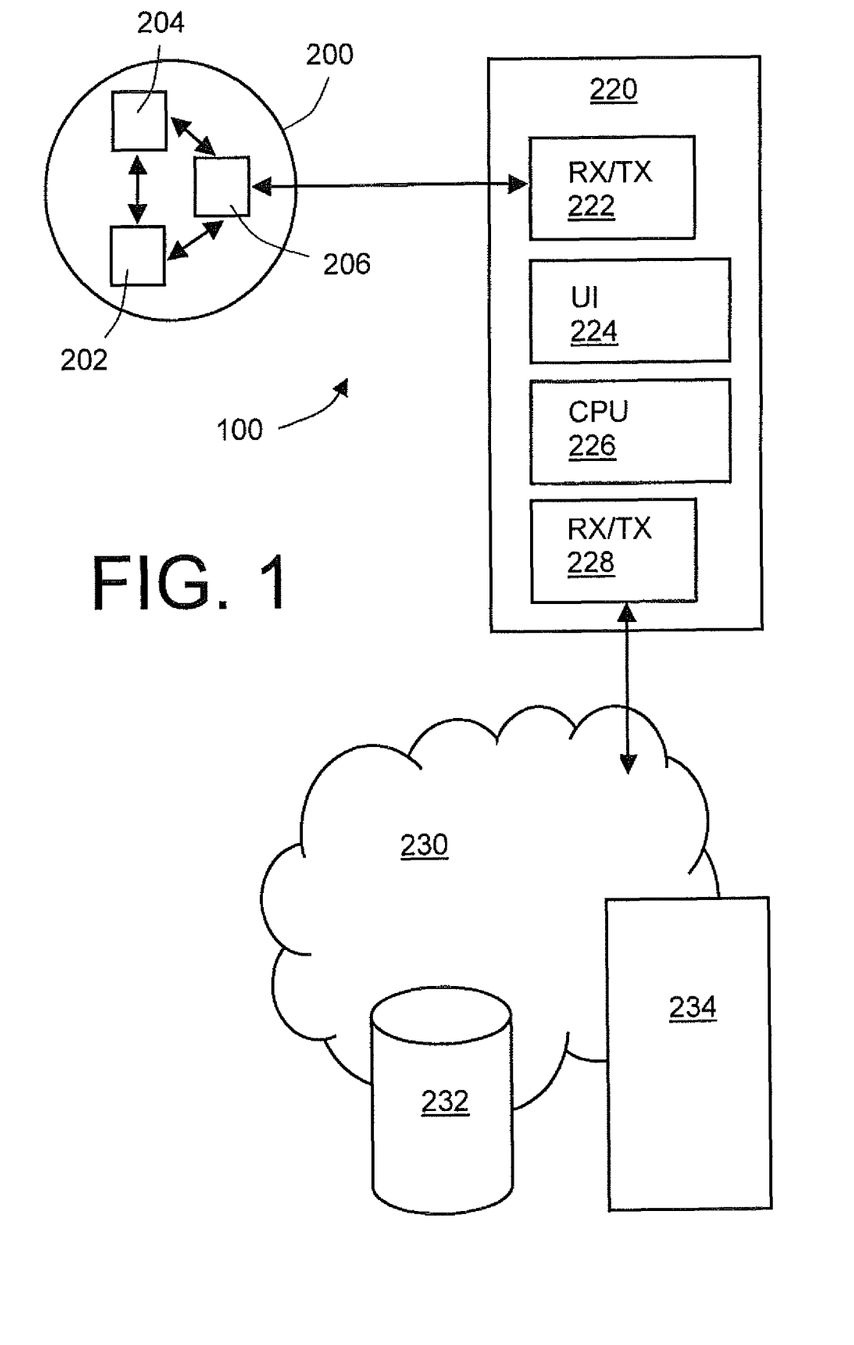
FIG. 1 is a schematic illustration of an example embodiment of a sports apparatus in accordance with the present disclosure.

The sports apparatus, indicated generally by 100 in FIG. 1, will now be described. Referring to FIG. 1, the apparatus 100 includes at least one projectile 200, for example a basketball. During the sporting event, the projectile 200 is acted upon by one or more human participants at the sporting event, as well as bouncing on a ground surface and one or more sports structure, for example basketball nets and associated back walls. The projectile 200 includes within its outer protective layer one or more sensors 204, for example one or more accelerometers, one or more gyroscopic sensors, one or more magnetometers, for recording motion, rotation, spin, and acceleration experienced by the projectile 200 in use. Optionally, the projectile 200, for example a ball, includes location transducers 202, for example a radio beacon arrangement, for sending signals to base stations for position measurement purposes, for example by triangulation based on received wireless signal strength at the radio beacon arrangement; alternatively, or additionally time-of-flight of transmitted pulse radio signals from the projectile 200 is employed by the apparatus 100 for determining an instantaneous spatial position of the projectile 200 within a given playing area associated with the sporting event. Optionally, the location transducers 202 also include a GPS receiver for determining a spatial position of the projectile from Earth-orbiting position reference satellites; such position determination is, for example, beneficial when the projectile 200 is implemented as a golf ball, wherein the sporting event is a golf tournament being executed over a spatially extensive golfing range. The projectile 200 also includes a wireless interface 206 for communicating sampled sensor signals from the one or more sensors 204, and optionally the location transducers 202 to a wireless receiving location remote from the projectile 200. Optionally, the projectile 200 includes a miniaturized server arrangement, for enabling the projectile 200 to be accessed conveniently using hypertext transport protocol (HTTP) communications.

The sports apparatus 100 further includes a mobile telephone 220, also known as a cell phone. Beneficially, the mobile telephone 220 is a smart phone with sufficient computational power in its central processing unit 226 to perform analysis of movements of the projectile 200 and determine its spatial location. The mobile telephone 220 includes a user interface 224 for presenting statistical analysis results from processing data communicated from the projectile 200 to the mobile telephone 220 via a wireless interface 222 of the mobile telephone 220. Moreover, the smart telephone 220 includes a smart wireless interface 228 for enabling the mobile telephone 220 to communicate via the Internet or similar data communication network to a server system 234 and/or to a remote database 232. Optionally, the apparatus 100 is operable to function with data exchanges occurring directly between the server system 234 and the remote database 232 when performing statistical analysis of sensor signals generated during motion of the projectile 200.

Examples of methods of use of the apparatus 100 will now be described. In a first example, the mobile telephone 220 sends information after each sports practice session, for example to Facebook ("Facebook" is a registered trade mark), namely an athlete using the apparatus 100 is able to share statistical analysis results generated by the apparatus 100 within a social network, for example for competitively improving individual sports performance. Optionally, the mobile telephone 220 is beneficially configurable to send a tweet every time the athlete makes a successful shot of the projectile 200.

In a second example, the mobile telephone 220 is operable to send one or more status updates to a social network each time the athlete is able to make a three-point shot of the projectile 200, namely able to score from a long distance behind a three-point line during the sporting event. In addition to third-party services such as Facebook and or Twitter ("Twitter" is a registered trade mark, associated with the "Twittersphere"), analytical statistical results generated by the system 100 can be sent to any specified service hosted on the Internet. Optionally, the results can be public or restricted, for example for personal use or for use by a dedicated group, for example a sports coach or other members of a specified team of athletes.

Figure 2:
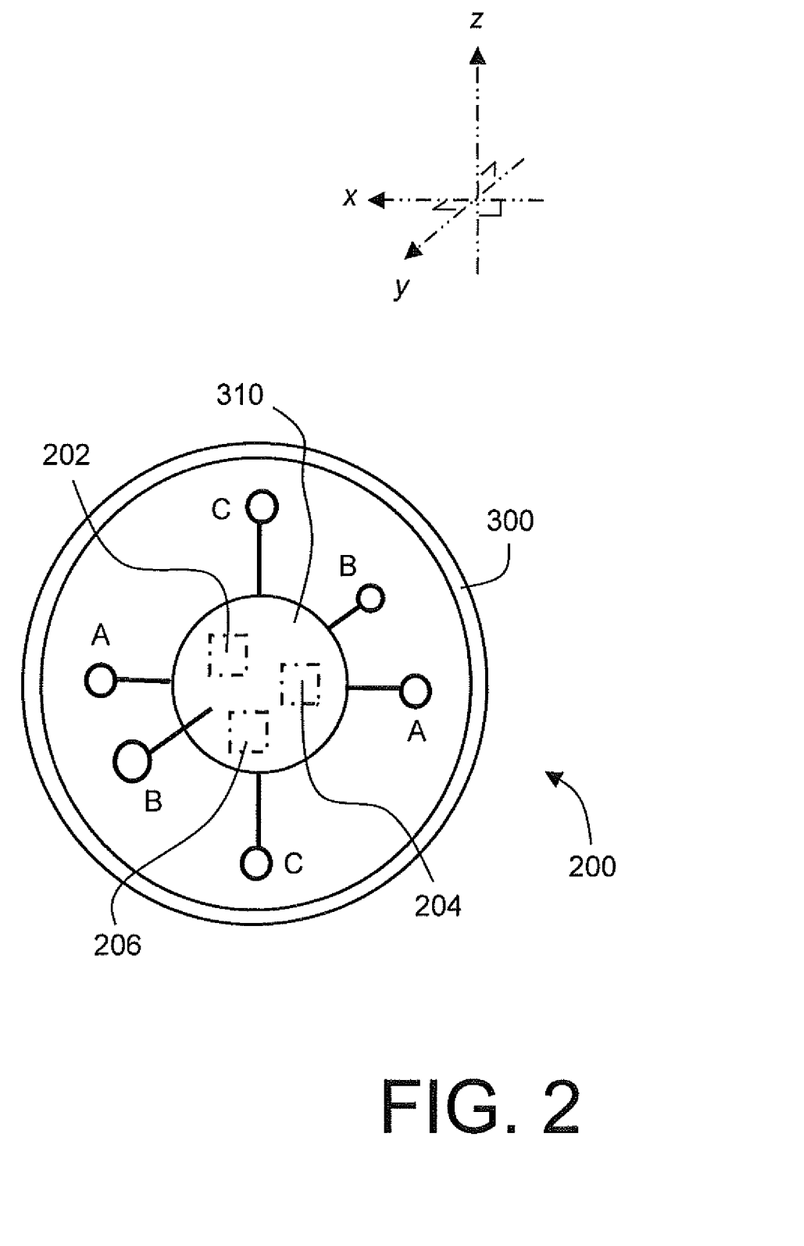
FIG. 2 is a schematic illustration of an implementation of a projectile of the sports apparatus of FIG. 1.

Referring next to FIG. 2, an example implementation of the projectile 200 is shown. The projectile 200 has an outer region 300, for example fabricated from an elastically deformable material, and a central armoured core 310 for accommodating the one or more sensors 204, the wireless interface 206, and optionally the location transducers 202. Beneficially, the wireless interface 206 is implemented as three sets of dipoles A-A, B-B, C-C which are individually excitable by the wireless interface 206; the dipoles are beneficially implemented in an orthogonal manner along three Cartesian x, y, z axes as shown. When communicating data, the wireless interface 206 sends data via the three dipoles which are excited at mutually different carrier-signal frequencies, such that the projectile 200 is capable of providing a pseudo-omnidirectional wireless emission polar pattern which avoids data dropout as the projectile 200 moves in use, for example rotates, and thus allows for more accurate position determination based upon received wireless signal strength from wireless emission from the projectile 200. Optionally, batteries of the projectile 200 are recharged by wireless inductive charging when the projectile 200 is not in use, for example in a storage unit overnight, thereby enabling the outer region 300 of the projectile 200 to be hermetically sealed, for example to avoid water ingress into the central armoured core 310 when the projectile 200 is in use in adverse weather conditions. Sensors might be charged also by using internal power generator taking energy from the movement of the ball. Example of such power generator can be kinetic power generator. Additional examples of power generation for the sensors might include solar cells etc. Sensor(s) in sporting equipment can be installed in the cover or inside of the sporting equipment. For example, in a golf ball the sensor can be in the middle of the golf ball i.e. embedded in the structure. If the sporting event is for example football (used in American football) there might be more than one sensor, for example two, i.e. one in both ends. This would enable more accurate analysis.

Software or computer program products include machine readable instructions recorded on machine-readable data storage media and executable upon computing hardware or in a processor device of the apparatus 100 are employed for analyzing movements of the projectile 200. Such analysis is optionally based upon classical physics, for example according to Newtonian Laws of motion. Alternatively, such analysis is based upon other computational techniques that will be described later.

A problem encountered when analyzing trajectories of the projectile 200 based upon classical physics is that such analysis requires a considerable number of data samples recording movements of the projectile 200 to be communicated; this is especially pertinent when the projectile 200 is subject to rapid movements, for example bouncing within a confined space wherein the projectile 200 rapidly changes its direction of motion.

Optionally, a volume of data needing to be communicated from the projectile 200 via its wireless interface 206 is susceptible to being reduced by computing hardware, for example a PIC micropower microcontroller or similar, included in the core 310 collecting sensor data at a high rate, for example at a 1 kHz sampling rate or higher, and then processing the sampled sensor data to determine whether or not changes in the sampled sensor data are greater than a defined threshold for at least M samples, wherein M is an integer greater than unity; in an event that changes in sensor data are less than the threshold during the M samples, no data is communicated from the projectile 200 to the mobile telephone 220. Optionally, the projectile 200 includes a data buffer for storing sampled sensor data for coping with a situation where the projectile 200 is subject to a long sustained period of rapid changes in motion.

Additionally in order to save power the sending of data can be tricked to take place only when there is movement of the sporting equipment. In general the sending of data from the sporting equipment sensors can be continuous, burst mode (i.e. sending buffered data) pull based (i.e. mobile phone requests the data) or push based i.e. sensor sends as unicast, multicast or broadcast the data to one or more receiving mobile phones or other stations. In some embodiments the sensors can perform calculations in the sporting event and send all or some of the data in analysed format to receivers or the service.

Figure 3:
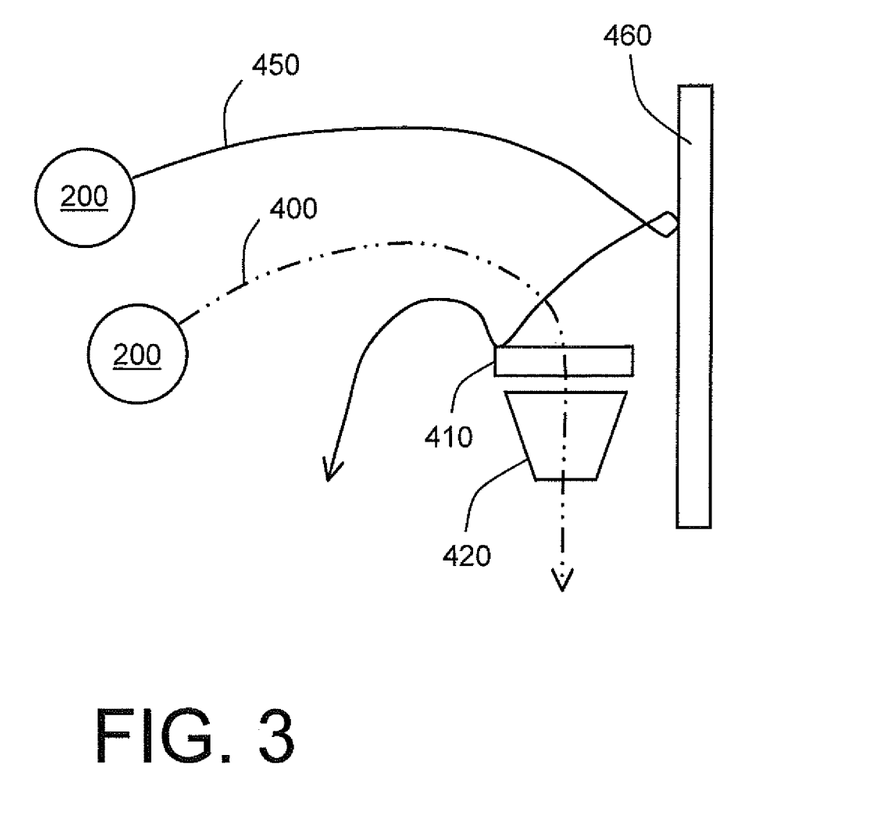
FIG. 3 is an illustration of a projectile path associated with the system of FIG. 1.

Referring to FIG. 3, a set of example trajectories of the projectile 200, for example a basketball, is illustrated. A first trajectory 400 of the projectile 200 follows an ideal path to pass centrally past a basketball net rim 410 and down through its associated net 420, without the projectile 200 being rapidly laterally displaced or its rotation characteristic being temporally abruptly altered. A second trajectory 450 of the projectile 200 follows a more complex path to a back wall 460 whereat the projectile 200 impacts and bounces back to hit the basketball net rim 410 to bounce subsequently therefrom away from the net 420. Motions of the projectile 200 as sensed by the projectile 200 for the first and second trajectories 400, 450 are radically different and are susceptible, for example, to being each recognized by a neural network algorithm executing on a least one of the mobile telephone 220 and the server system 234. Beneficially, most of the neural network processing is performed on the mobile telephone 220 for reducing a volume of data needing to be communicated from the mobile telephone 220 to the server system 234, thereby conserving wireless communication bandwidth resources. Additionally sensor(s) in a sporting equipment can also include magnetometer or similar to recognize change in magnetic field. This is beneficial for detecting for example if a basketball goes thru basketball net rim 410.

Figure 4:
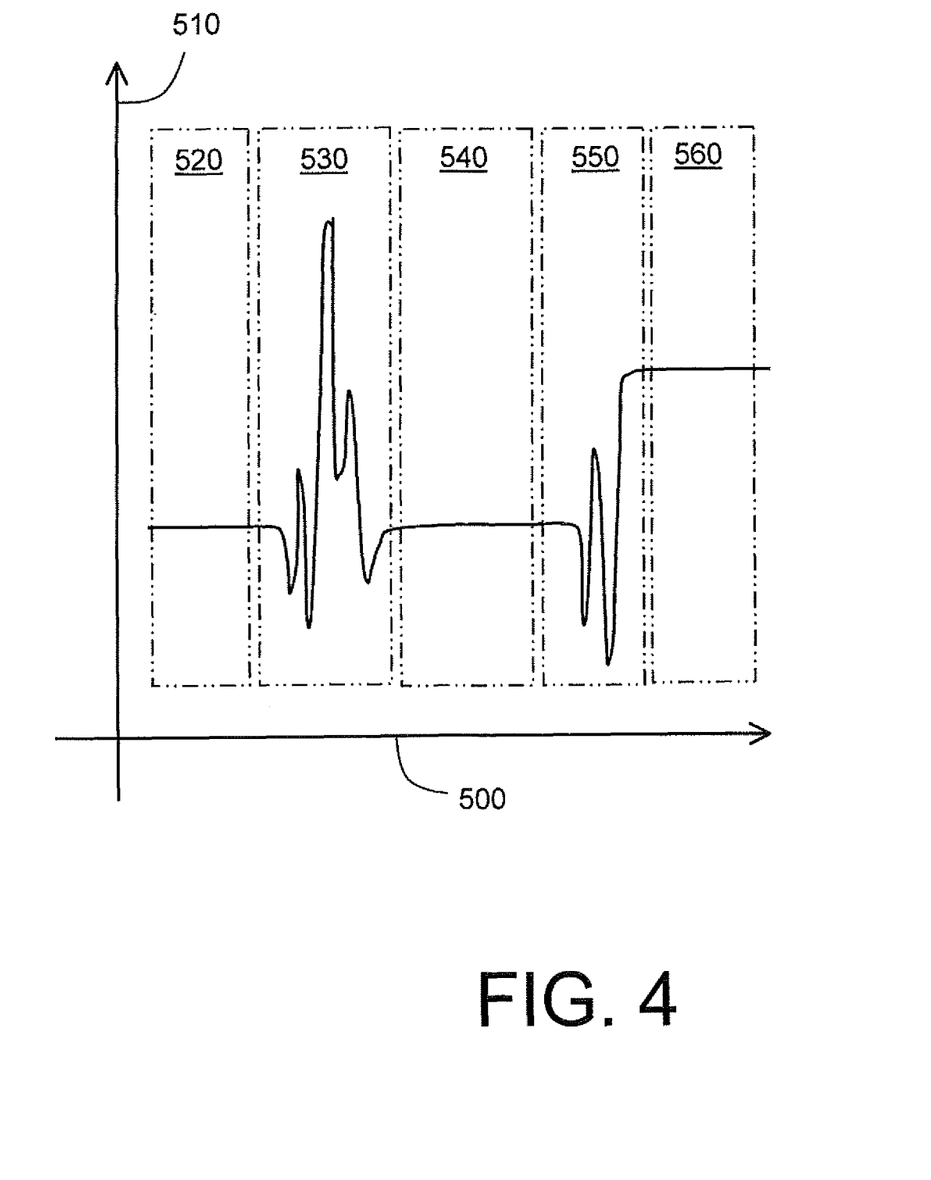
FIG. 4 is an illustration of example movement signals associated with a projectile of the system of FIG. 1.

Referring the FIG. 4, sampled sensors signals corresponding to the aforesaid second trajectory 450 are shown. In FIG. 4, an abscissa axis 500 denotes a passage of time from left to right, and an ordinate axis 510 denotes samples sensor signal value. A first portion 520 of the trajectory 450 has relatively small changes in sampled sensor data, whereas bouncing from the back wall 460 results in rapidly changing data in a second portion 530. A third portion 540 of the trajectory 450 between the back wall 460 and basketball net rim 410 has associated therewith relatively little change in sample sensor data from the projectile 200, whereas the bounce outward from the basketball net rim 410 results in a fourth portion 550 of the trajectory 450 with rapid changes. Finally, a fifth portion 560 of the trajectory 450 where the projectile 200 is bouncing outwardly away from the basketball net rim 410 has relatively slowly changing sampled sensor data associated therewith.

The aforementioned neural network software, for example downloaded to the mobile telephone 220 as a software application, for example from an "App Store", is beneficially trained to recognize different patterns of movement of the projectile 200 during the sporting event. For example, the projectile 200, for example a basketball ball, is shot towards a central opening of the basketball net rim 410 for N times, and a user interface (UI), for example a touch screen, of the mobile telephone 220 is used to inform the neural network software whether or not the shot was successful, namely passed correctly through the net 420. Moreover, the neural network software is also informed via the user interface (UI) if the shot were a normal shot or three-point shot. After a series of such learning exercises, the neural network software is capable of resulting in the mobile telephone 220 being able to recognize immediately what type of shot has been executed for the projectile 200. Optionally, learning parameters for the neural network software can be pre-loaded into the mobile telephone 220, thereby avoiding a need for aforesaid training, for example in an event that sensor characteristics of the projectile 200 are known beforehand, for example the projectile 200 is a mass-produced proprietary product. Optionally, users are able to share their neural network software training parameters with other users of the apparatus 100.

The apparatus 100 is capable of being employed in a wide range of sports, for example bowling, tennis, football, rugby, basketball, baseball, cricket, water polo, but not limited thereto. By the mobile telephone 220, it is meant one or more of communication devices such as: telephones, personal data assistants (PDA's) provided with wireless interfaces, tablet computers provided wireless interfaces, personal computers or laptops with wireless interface or other wireless computing device but not limited thereto.

Example Apparatus

Figure 5:
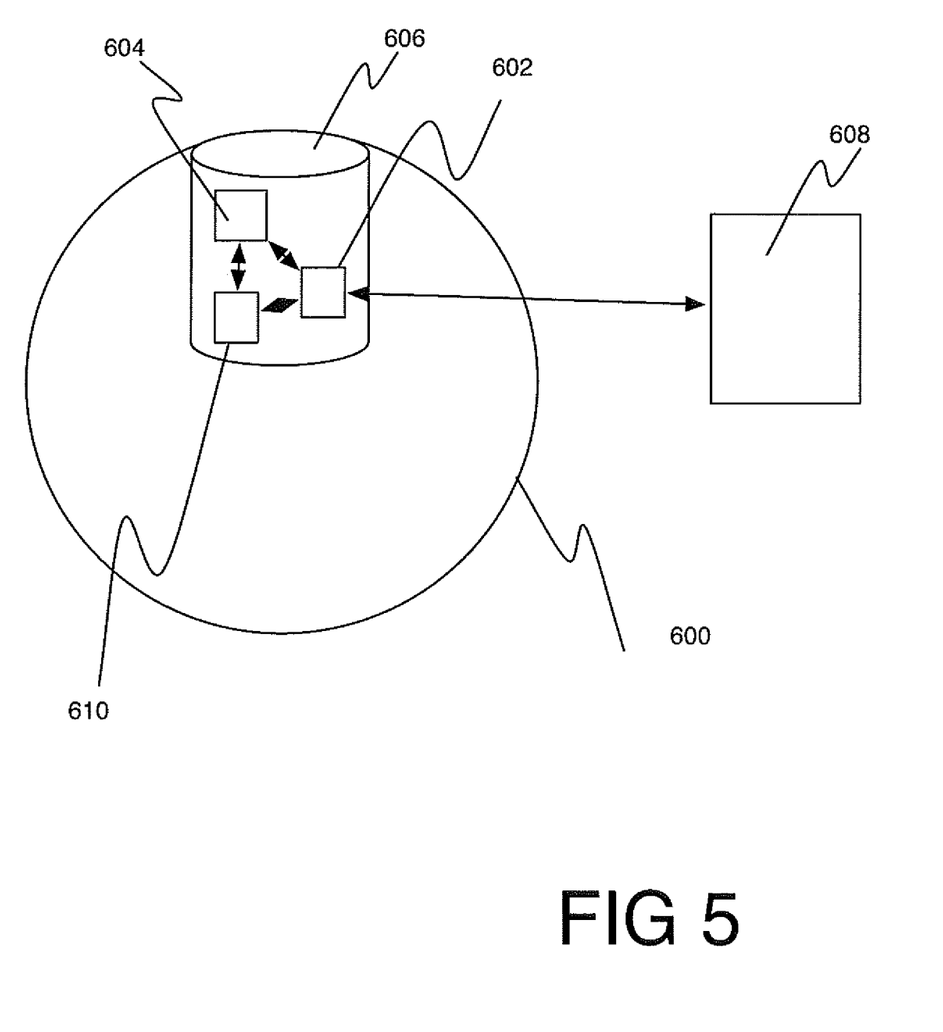
FIG. 5 is an illustration of example embodiment of a sports apparatus in accordance with the present disclosure.

FIG. 5 shows example basket ball 600 which was used to test some aspects of the disclosure. A cylinder like housing 606 was used to house needed electronics. Sensors 604 included at least one of accelerometer, gyroscope and magnetometer. The sensor data was collected and buffered by microcontroller 610 and data was send in periodic matter over radio interface using Bluetooth transmitter 602. In the set up sample rate to collect data from the sensors was 70 Hz. The data was sent to receiving station 608. In the setup the receiving station was a laptop style computer equipped with Bluetooth chip to enable communication with the basketball 600. Alternatively, the receiving station could be for example mobile phone, smart phone i.e. any computing device.

In general the radio communication from the ball 600 can be done using conventional radio interfaces such as Bluetooth radio. The used protocols can include for example using Internet Protocol (IP) stack in addition to proprietary protocols. In the test arrangement the amount of data collected during the shot and hitting the rim and floor exceeded data communication speed of the used Bluetooth connection therefore the buffering was used and the data was transferred during low movement stage of the ball.

In the example measurements accelerometer data of the sensors was collected and accelerometer from each x, y, and z accelerometers was summed. i.e. total experienced accelerometer was stored initially to memory of the microcontroller 610. The accelerometer data was sent to computing device 608.

Figure 6:
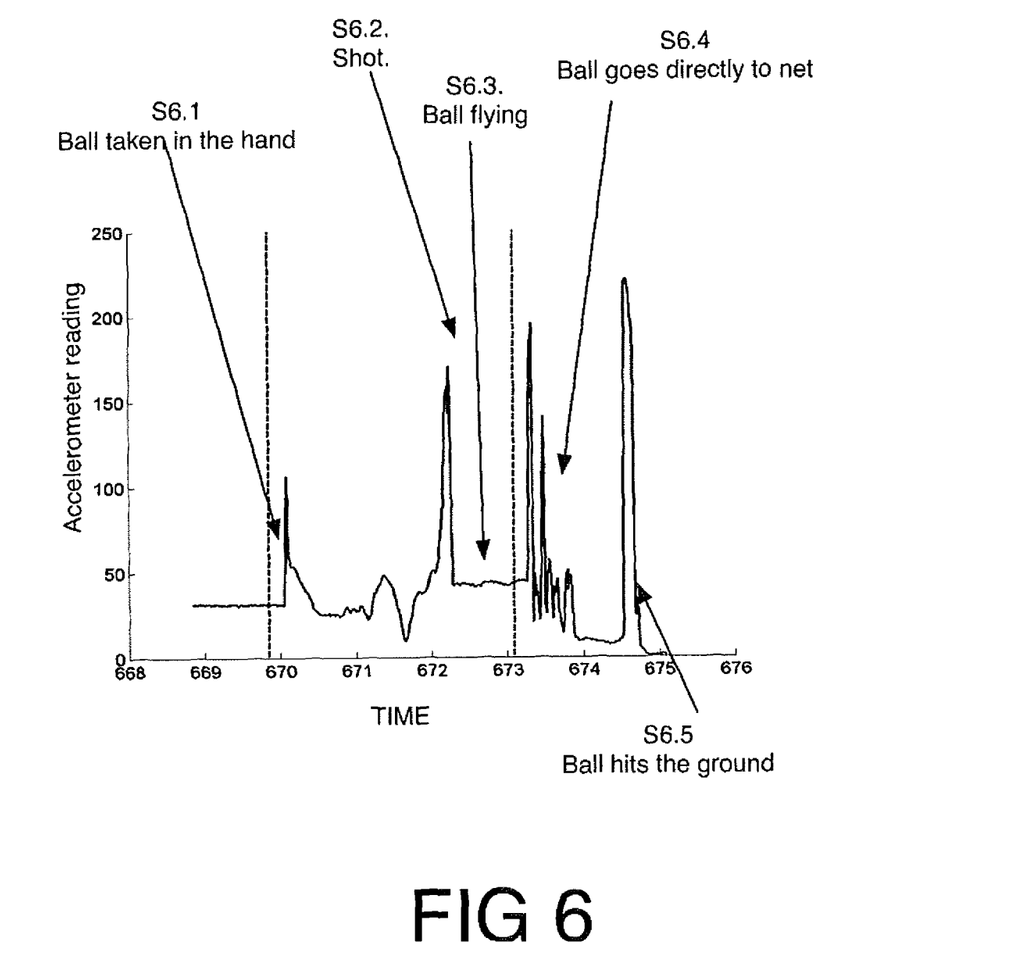
FIG. 6 is an example measured sensor data from a sports apparatus (basket ball) for success full shot.
Figure 7:
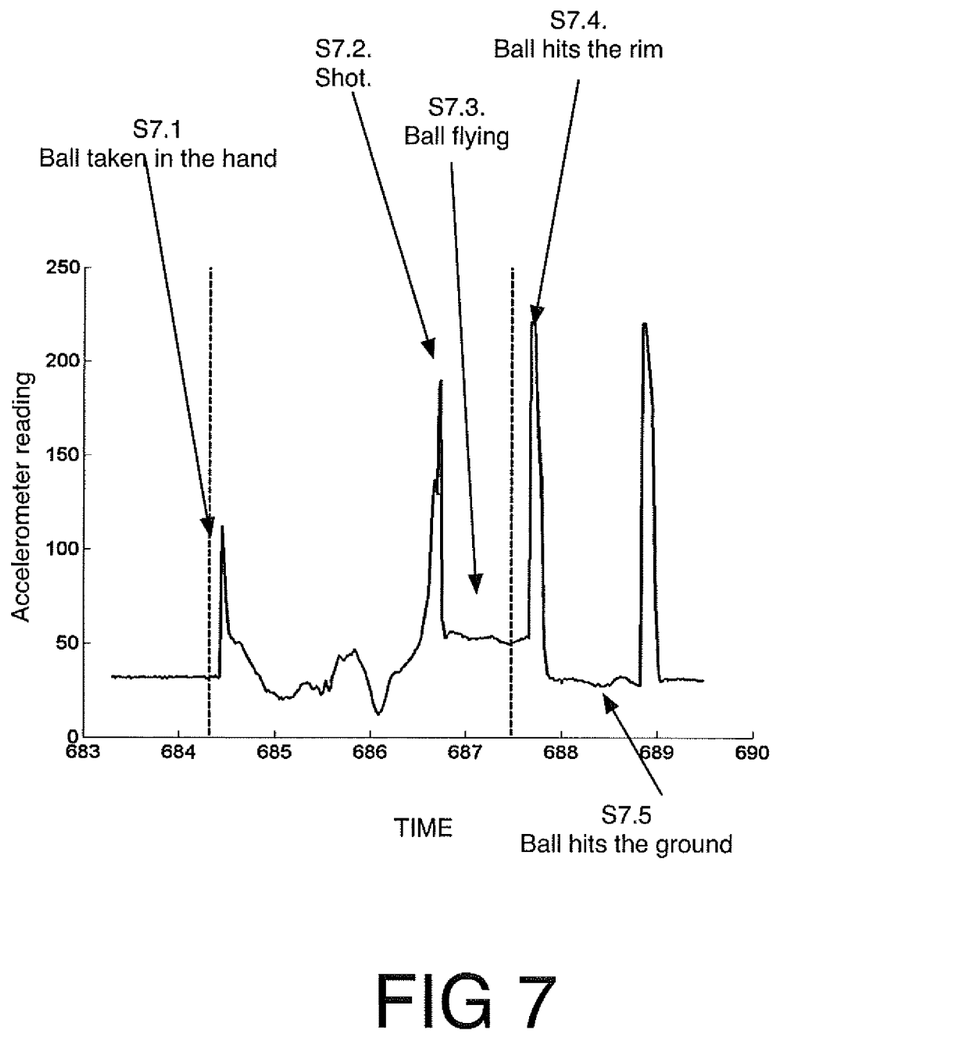
FIG. 7 is an example measured sensor data from a sports apparatus (basketball) for missed shot.

FIGS. 6 and 7 show the results of the measured values of the total acceleration of a basketball during a shot. The measured values of total acceleration generally represents the total acceleration as a function of time. Accelerometer reading is in arbitrary units and has not been normalized.

The data is used in a mathematical model such as neural network in order to classify the shots into makes and misses. This modeling may involve pre-processing of the data in order to make the model more transparent and more effective. The pre-processing may be done using statistical techniques such as principal component analysis or by calculating given descriptive statistics for measured trajectories. These descriptive statistics can be, for example, maximal and minimal values of the acceleration (i.e., peaks of the curves), the time instants related to these peaks, the lengths of the time intervals between these peaks, or other properties of the curves during given intervals such as variance (measuring the variability of the acceleration) or the sign of derivative acceleration during given intervals (describing whether the acceleration increases or decreases during the time interval). These descriptive statistics provide information about the trajectory of the basketball that is easier to use in the mathematical model instead of the raw data. For example, the length of the time interval between the release of the shot and the time when the ball hits the rim provides implicit information about the arc of the shot, as a higher arc leads to longer flight times. On the other hand, highly variable values of the acceleration after hitting the rim imply interaction between the basketball and the net (suggesting a made shot) instead of smooth acceleration curve related the "free flight" of a missed shot.

Referring to FIG. 6, in step S6.1 the ball is taken from the floor by the player. The player shoots the ball in step S6.2. In step S6.3 the ball is flying for about one second. Accelerometer reading does not change considerable during the flight time. In step S6.4 the ball goes directly to the net. In the data one can observe periodic fluctuations with decreasing amplitude. The said periodic behaviour can be found from the data automatically for example by performing Fourier analysis of the data. In step S6.5 the ball hits the ground and a large accelerometer peak is observed.

FIG. 7 shows other example of measured total accelerometer data. In Step S7.1. the ball is taken in the hand from the floor. In step S7.2 the ball is shot and in step S7.3 the ball is flying. One can see that the form factor of the accelerometer data between steps S7.1-S7.3 resembles form factor of FIG. 6 and steps S6.1-S6.3 respectively indicating feasibility of using said data as one reference for neural network system. In step S7.4 the ball hits the rim and then after about on second hits the ground in step S7.5.

According to embodiments each or some of the measurements are used as base line for the learning algorithms. As an example the data can be analysed and marked manually to form training patterns for said neural networks. Said training patterns can be shared in the system in order to be used by all or some of the other players. The learning database can be thus grown and developed by using input from plurality of players.

Figure 8:
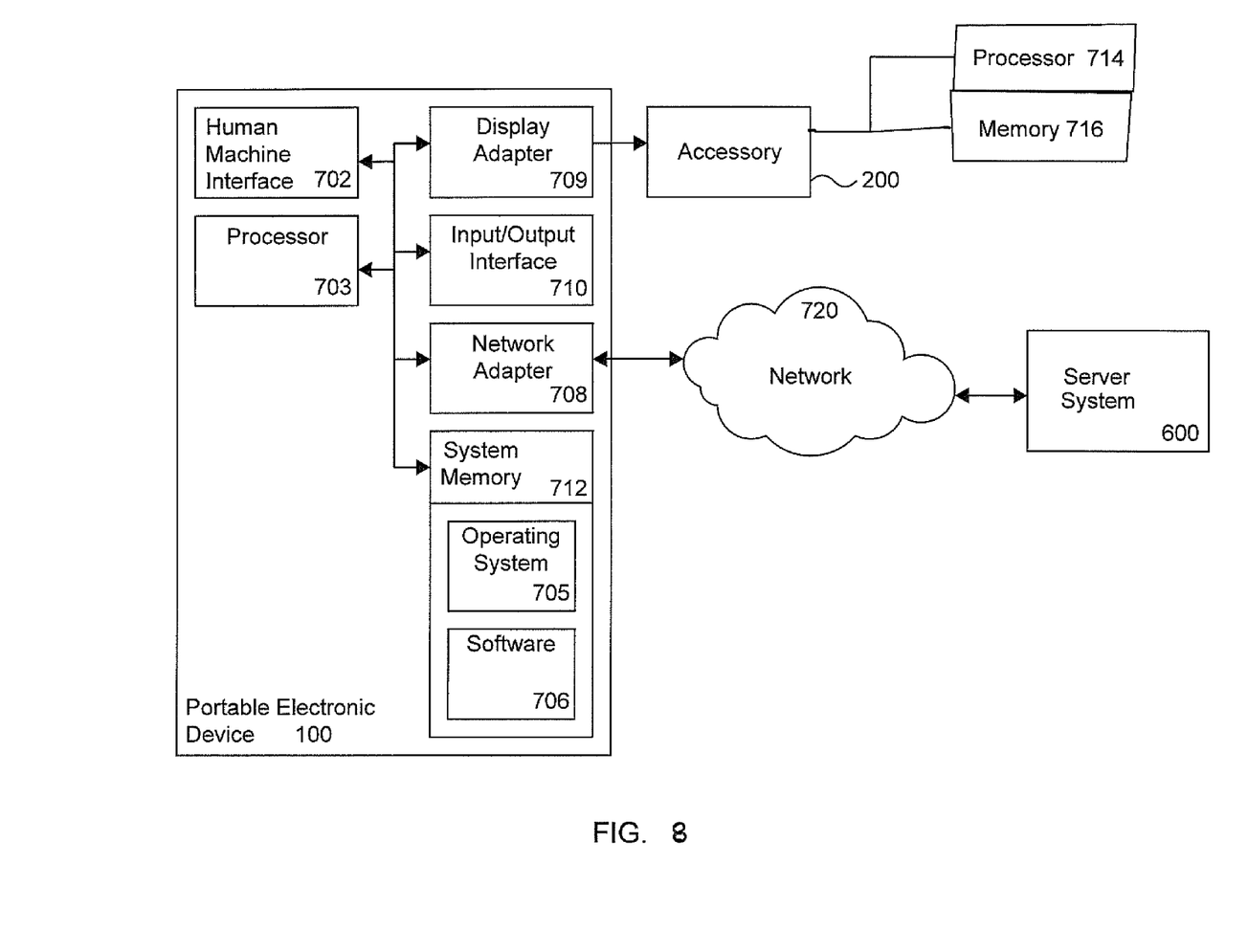
FIG. 8 is a block diagram of one embodiment of an exemplary environment that can be used to practice aspects of the present disclosure.

FIG. 8 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

As is illustrated in FIG. 8, in one embodiment, the components of the portable electronic device 100 can include, but are not limited to, one or more processors or processing units 703, an operating system 705, a network adapter 708, a system data storage device or memory 712, an Input/Output Interface 710, a display adapter 709 and a system bus 713 that couples various system components including the processor 703 to the system memory 712. In the case of multiple processing units 703, the system can utilize parallel computing.

The portable electronic device 100 typically includes computer readable media. Exemplary readable media can be any available media that is non-transitory and accessible by the portable electronic device 100 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as demand control data 707 and/or program modules such as an operating system 705 that is immediately accessible to and/or are presently operated on by the processing unit 703. In one aspect, the system memory 712 contains computer executable codes sections for performing the processes and steps described herein.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, and distributed computing environments that comprise any of the above systems or devices, and the like.

The processing of the disclosed methods and systems can be performed by software components and computer program products which include or comprise non-transitory computer readable code means that when executed by a processor device are configured to execute the aspects of the methods of the present disclosure. The disclosed systems and methods can be described in the general context of computer-executable instructions, such as program modules, being executed by one or more computers, processors or other devices. Generally, program modules comprise computer code, routines, programs, objects, components, data structures, etc. that perform particular tasks or implement particular abstract data types. The disclosed methods can also be practiced in distributed computing environments where tasks are performed by remote processing devices that are linked through a communications network. In a distributed computing environment, program modules can be located in both local and remote computer storage media including memory storage devices.

The systems and methods disclosed herein can be implemented via one or more portable electronic devices or mobile phones 220, such as that shown in FIG. 1. As is illustrated in FIG. 1 in one embodiment, the components of the apparatus 100 can include, but are not limited to, a wireless interface 228, one or more processors or processing units 226, a system data storage device or memory 225, a user interface 224, and a short range radio communication device 222. The mobile phone 220 is communicatively coupled to a network such as the Internet 230, which is also communicatively coupled to a database or memory 232 and a server system 234.

The apparatus 100 and the mobile phone 220, for example, typically include computer readable media. Exemplary readable media can be any available media that is non-transitory and accessible by the mobile phone device 220 and comprises, for example and not meant to be limiting, both volatile and non-volatile media, removable and non-removable media. The system memory 225 comprises computer readable media in the form of volatile memory, such as random access memory (RAM), and/or non-volatile memory, such as read only memory (ROM). The system memory 225 typically contains data and/or program modules that are immediately accessible to and/or are presently operated on by the processing unit 226. In one aspect, the system memory 225 contains computer executable codes sections for performing the processes and steps described herein.

In another aspect, the apparatus 100, as well as the mobile phone 220, can also comprise other non-transitory, removable/non-removable, volatile/non-volatile computer storage media. By way of example, the system memory 225 can in one embodiment include or comprises a mass storage device that can provide non-volatile storage of computer code, computer readable instructions, data structures, program modules, and other data for the apparatus 100. For example and not meant to be limiting, a mass storage device can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Modifications to embodiments of the invention described in the foregoing are possible without departing from the scope of the invention as defined by the accompanying claims. Expressions such as "including", "comprising", "incorporating", "consisting of", "have", "is" used to describe the present invention are intended to be construed in a non-exclusive manner, namely allowing for items, components or elements not explicitly described also to be present. Reference to the singular is also to be construed to relate to the plural.

We claim:

1. A sports apparatus for monitoring movement of a basketball, comprising:
   a sensor disposed within the basketball;
   a wireless interface disposed within the basketball for communicating sampled data signals from the sensor;
   a portable communication device coupled in wireless communication with the wireless interface of the basketball for receiving the sampled data signals from the sensor, the sampled data signals indicative of a motion of the basketball;
   wherein the portable communication device comprises a processor having a memory including programming instructions that when executed by the processor are configured to cause the processor to:
      detect a sensor signal from the wireless interface, the sensor signal comprising the sampled data signals from the sensor;
      determine a first trajectory of the basketball from the sensor signal; and
      determine if the first trajectory comprises one or more of small changes, large changes, rapid changes or slow changes in amplitude over time in the sampled data signals of the motion of the basketball;
      determine if the first trajectory comprises a shot taken with the basketball, wherein the shot taken by the basketball is identified by the sensor detecting one or more slow changes in the sampled data signals over time and a rapid change in amplitude of the sampled data signals followed by a period of one or more slow changes in the sampled data signals over time;
      determine if the first trajectory comprises passage of the basketball through a goal structure by detecting a change in an angular velocity of the basketball without the basketball being rapidly laterally displaced and without the basketball's rotation characteristic being temporally abruptly altered; and
      determine if the first trajectory comprises an impact of the basketball with an object.

2. The sports apparatus of claim 1, wherein a central armoured core within the basketball is configured to house the sensor and the wireless interface.

3. The sports apparatus of claim 1, wherein the wireless interface comprises three sets of dipoles, each individually excitable by the wireless interface and wherein the three dipoles are disposed in an orthogonal manner along three Cartesian axes.

4. The sports apparatus of claim 1, wherein the wireless interface is a short range radio receiver/transmitter and the portable communication device is a smart phone.

5. The sports apparatus of claim 1, comprising a wirelessly chargeable battery for the wireless interface disposed within the basketball.

6. The sports apparatus of claim 1, wherein the sensor signal from the wireless interface corresponds to a detected change in a magnetic field; and the processor is configured to determine the passage of the basketball through the goal structure based on the change in the magnetic field where the goal structure is a basketball rim.

7. The sports apparatus of claim 1, wherein the processor is configured to:

determine a point value associated with the passage of the basketball through the goal structure by:
  detecting a sensor signal from the wireless interface corresponding to a location of the basketball at a point in time corresponding to a starting point of the first trajectory;
  comparing the location of the basketball at the starting point of the first trajectory to a mapping of a playing area; and
  determining the point value based on the location of the basketball at the starting point of the first trajectory relative to the mapping of the playing area.

8. The sports apparatus of claim 1, wherein the processor is configured to determine that the first trajectory comprises an impact of the basketball with an object by:
  detecting a period of the small changes in the sensor data; and
  detecting a period of the rapidly changing sensor data from the wireless interface within a sensor data sample set.

9. The sports apparatus of claim 1, wherein the processor is configured to:
  detect a first sensor signal indicative of a launching of the basketball into the air, the first sensor signal comprising an accelerometer signal;
  detect a second sensor signal indicative of an airborne travel of the sports projectile, the second sensor signal comprising an accelerometer signal that is substantially constant compared with the first signal;
  detect a third sensor signal indicative of the passage of the basketball through the goal structure; and
  detect a fourth sensor signal indicative of the basketball striking an object, the fourth sensor signal comprising an accelerometer signal that changes substantially from the second sensor signal.

10. The sports apparatus of claim 1, wherein a central core of the basketball comprises a data buffer for storing data from the sensor, the programming instructions that when executed by a computing hardware, are configured to cause the computing hardware to:
  compare changes in the sampled sensor data to a predefined threshold for a predetermined number of data samples;
  transmit the sampled sensor data to the portable communication device only when the changes in the sampled sensor data exceed the predefined threshold; and
  store the sampled sensor data when the changes in the sampled sensor data are less than the predefined threshold.

11. The sports apparatus of claim 10, the computing hardware including programming instructions, that when executed by a microcontroller in the central core, are configured to cause the computing hardware to:
  determine that the changes in the sampled sensor data are greater than the predetermined threshold over a time period exceeding a predetermined time period; and
  store the changes in the sampled sensor data.

12. The sports apparatus of claim 1, comprising a server arrangement remote from and communicatively coupled with the portable electronic device, the portable electronic device configured to communicate analysis data of the sensor signal to the server arrangement through a network.

13. The sports apparatus of claim 1, wherein the memory of the processor includes programming instructions that when executed by the processor are configured to cause the processor to compare the determined trajectory to one or more stored trajectory patterns and identify the type of shot taken with the basketball from the comparison of the first trajectory to the one or more stored trajectory patterns.

14. The sports apparatus of claim 1, wherein the memory of the processor includes programming instructions that when executed by the processor are configured to cause the processor to determine that the shot results in one or more of:
  the basketball going in the net after the shot by the sensor detecting period fluctuations in the sensor signal over time with decreasing amplitude;
  the basketball hitting a rim of a net after the shot by the sensor detecting a first large change in amplitude of the sensor signal followed by a period of small changes in the amplitude of the sensor signal and at least a second large change in the amplitude of the sensor signal; or
  the basketball hitting the ground after the shot by the sensor detecting a large change in the amplitude of the sensor signal.

15. A method of using a sports apparatus for monitoring movement of a basketball including a sensor and a wireless interface disposed within the basketball for communicating sampled data signals from the sensor, and a portable communication device coupled in wireless communication with the sensor in the basketball for receiving the sampled data signals from the sensor, the sampled data signals indicative of a motion of the sport projectile, the method comprising:
  detecting in the portable communication device, a sensor signal from the wireless interface, the sensor signal comprising the sampled data signals from the sensor; and
  using a central processing unit to:
    determine a first trajectory of the basketball from the sensor signal;
    determine if the first trajectory comprises a shot taken with the basketball by the sensor first detecting one or more slow changes in the sampled data signals over time followed by a rapid change in amplitude of the sampled data signals followed by a period of one or more slow changes in the sampled data signals over time; and
    determine that the shot results in one or more of:
      the basketball passing through the net after the shot by the sensor detecting a change in an angular velocity of the basketball without the basketball being rapidly laterally displaced and without the basketball's rotation characteristic being temporally abruptly altered;
      the basketball hitting a rim of a net after the shot by the sensor detecting a first large change in amplitude of the sensor signal followed by a period of small changes in the amplitude of the sensor signal and at least a second large change in the amplitude of the sensor signal; or
      the basketball hitting the ground after the shot by the sensor detecting a large change in the amplitude of the sensor signal.

16. The method of claim 15, comprising:
using the central processing unit to:
  analyse a sensor signal from the wireless interface to determine a change in a magnetic field; and
  determine a passage of the basketball through the goal structure based on the change in the magnetic field and the determined first trajectory where the goal structure is a basketball rim.

17. The method of claim 15, comprising:
using the central processing unit to:
  analyse a sensor signal from the wireless interface to determine a change in an angular velocity; and
  determine a passage of the basketball through the goal structure based on the change in the angular velocity and the determined first trajectory.

18. The method of claim 15, comprising:

using the central processing unit for determining a point value associated with the passage of the basketball through the goal structure by:
- analysing a sensor signal from the wireless interface to determine a location of the basketball at a point in time corresponding to a starting point of the first trajectory;
- comparing the location of the basketball at the starting point of the first trajectory to a mapping of a playing area; and
- determining the point value based on the location of the basketball at the starting point of the first trajectory relative to the mapping of the playing area.

19. The method of claim 15, comprising:

using the central processing unit for determining the first trajectory comprising impact of the basketball with an object by analysing the sensor data to:
- determine a period of small changes in the sensor data; and
- determine a period of rapidly changing sensor data from the wireless interface within a sensor data sample set.

20. The method of claim 15, comprising:

using the central processing unit to:
- analyse a first sensor signal to determine a launching of the basketball into the air, the first signal comprising an accelerometer signal;
- analyse a second sensor signal to determine an airborne travel of the sports projectile, the second sensor signal comprising an accelerometer signal that is substantially constant compared with the first signal;
- analyse a third sensor signal to determine the passage of the basketball through the goal structure; and
- analyse a fourth sensor signal to determine the basketball striking an object, the fourth sensor signal comprising an accelerometer signal that changes substantially from the second sensor signal.

21. The method of claim 15, comprising:

using a microcontroller in the projectile for:
- comparing changes in the sampled sensor data to a predefined threshold for a predetermined number of data samples;
- transmitting the sampled sensor data to the portable communication device only when the changes in the sampled sensor data exceed the predefined threshold;
- storing the sampled sensor data when the changes in the sampled sensor data are less than the predefined threshold;
- determining that the changes in the sampled sensor data are greater than the predetermined threshold over a time period exceeding a predetermined time period; and
- storing the changes in the sampled sensor data.

22. A computer program product comprising machine readable instructions recorded on a non-transitory machine-readable data storage media, which when executed by the central processing device are configured to execute the method according to claim 15.

* * * * *